(12) United States Patent
Archer et al.

(10) Patent No.: US 8,280,989 B2
(45) Date of Patent: Oct. 2, 2012

(54) METHOD, SYSTEM AND APPARATUS FOR PROVISIONING A COMMUNICATION CLIENT

(75) Inventors: Nathan Gerald Archer, Russell (CA);
David William Clark, Carp (CA);
Yannick Lessard, Ottawa (CA);
Matthew Soan Rose, Nepean (CA);
William Barry Crago, Stouffville (CA)

(73) Assignee: BCE Inc., Verdun, Quebec (CA)

( * ) Notice: Subject to any disclaimer, the term of this patent is extended or adjusted under 35 U.S.C. 154(b) by 556 days.

(21) Appl. No.: 12/519,022

(22) PCT Filed: Dec. 14, 2006

(86) PCT No.: PCT/CA2006/002051
§ 371 (c)(1),
(2), (4) Date: Jun. 12, 2009

(87) PCT Pub. No.: WO2008/070952
PCT Pub. Date: Jun. 19, 2008

(65) Prior Publication Data
US 2010/0023603 A1    Jan. 28, 2010

(51) Int. Cl.
*G06F 15/177* (2006.01)
(52) U.S. Cl. ............ 709/220; 709/225; 455/456.1; 379/37
(58) Field of Classification Search .......... 709/220
See application file for complete search history.

(56) References Cited

U.S. PATENT DOCUMENTS

| | | |
|---|---|---|
| 6,711,132 B2 | 3/2004 | Lazarus |
| 7,139,247 B2 | 11/2006 | Desai et al. |
| 2002/0178163 A1* | 11/2002 | Mayer ................ 707/10 |
| 2003/0112930 A1 | 6/2003 | Bosik et al. |
| 2005/0025136 A1 | 2/2005 | Anschutz et al. |
| 2005/0069097 A1 | 3/2005 | Hanson et al. |
| 2005/0190892 A1 | 9/2005 | Dawson et al. |
| 2006/0230137 A1 | 10/2006 | Gare et al. |

FOREIGN PATENT DOCUMENTS

| | | |
|---|---|---|
| EP | 1 708 468 A1 | 10/2006 |
| WO | 2004/059994 A2 | 7/2004 |
| WO | 2006/057878 A2 | 6/2006 |

OTHER PUBLICATIONS

International Search Report mailed on Apr. 24, 2007 in connection with corresponding International Application No. PCT/CA2006/002051.
Written Opinion of the International Searching Authority mailed on Apr. 24, 2007 in connection with corresponding International Application No. PCT/CA2006/002051.
Panagiotakis et al., "Intelligent service mediation for supporting advanced location and mobility-aware service provisioning in reconfigurable mobile networks", IEEE Wireless Communications, vol. 9, Issue 5, Oct. 2002, pp. 28-38 (whole document).

* cited by examiner

*Primary Examiner* — Hua Fan

(57) ABSTRACT

According to embodiments of the present invention, there is provided a method, system and apparatus for provisioning a communication client. The method comprises receiving via a communication network a request from the communication client. The method further comprises determining a positioning object associated with the communication client. The method further comprises, based on the positioning object, determining a subscription profile associated with the communication client. The method further comprises, based on the subscription profile, compiling a configuration file.

36 Claims, 6 Drawing Sheets

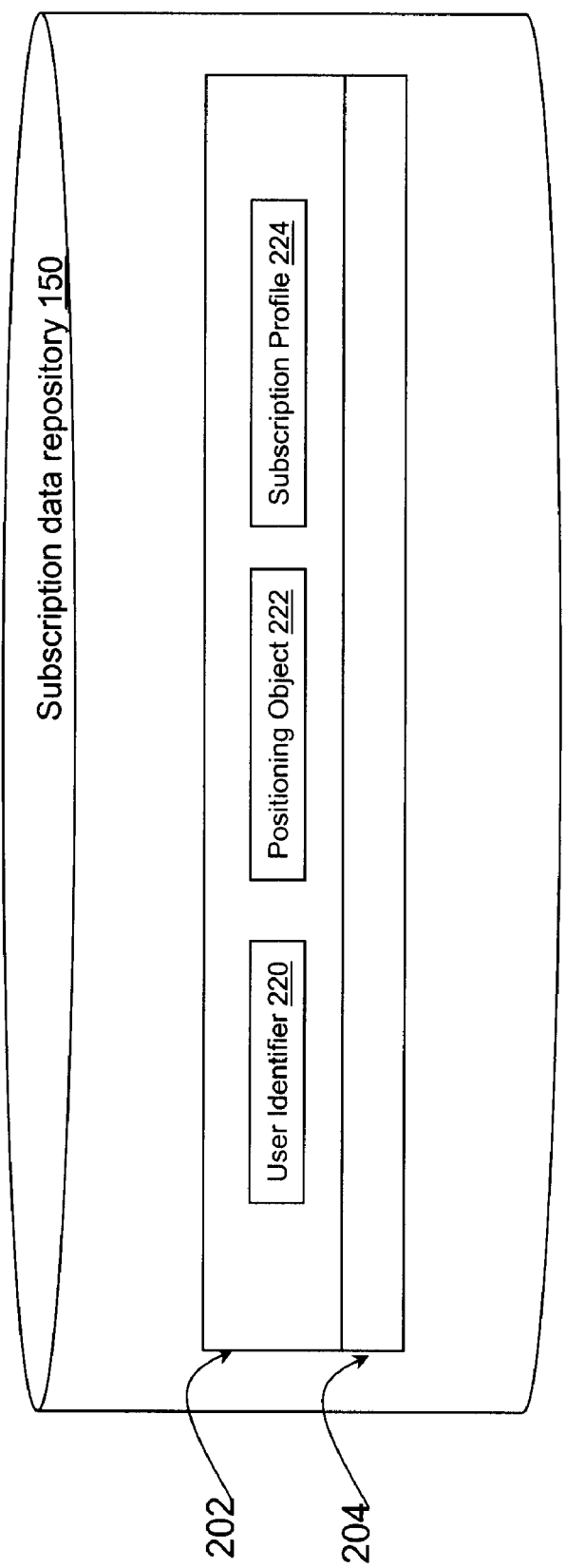

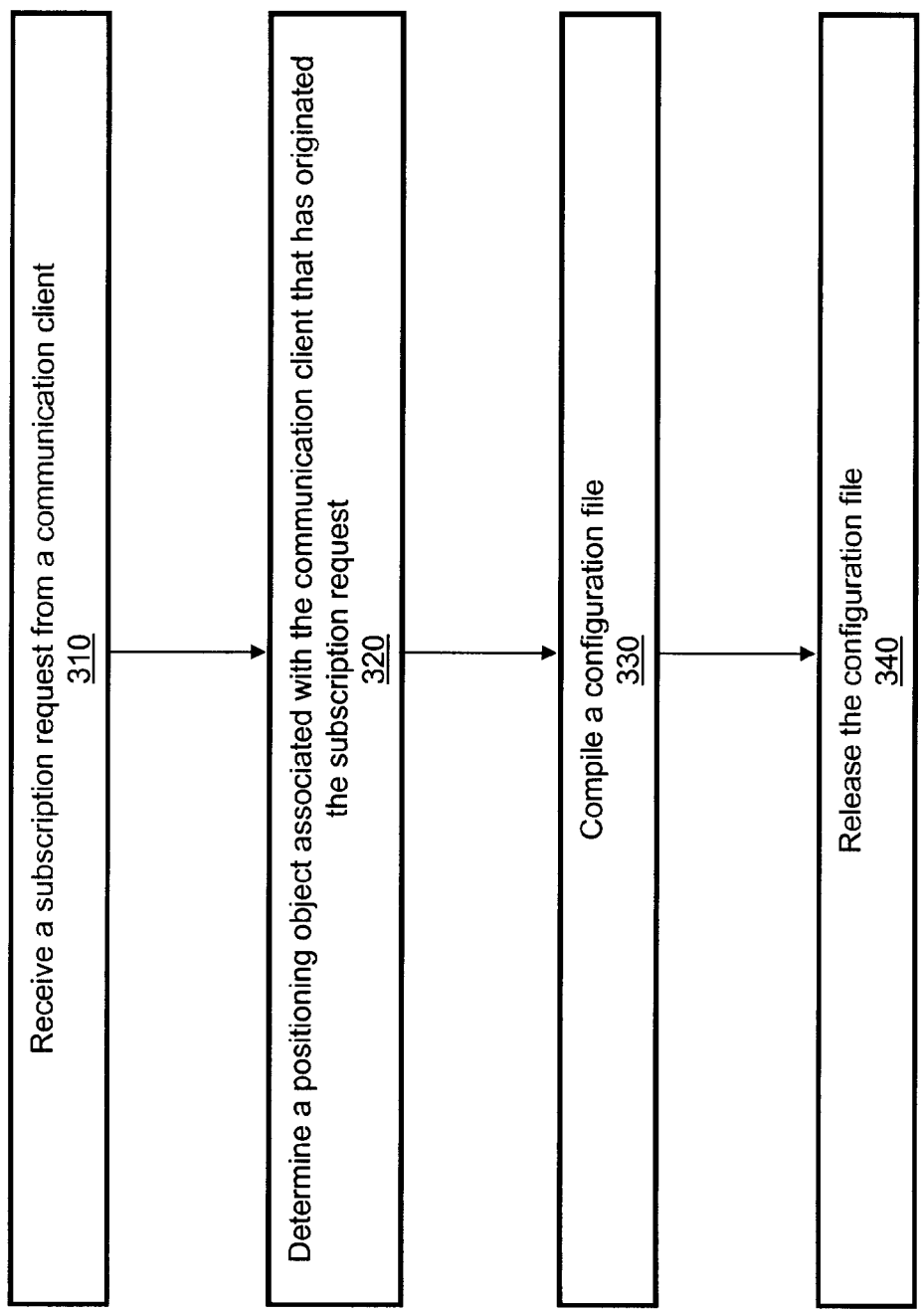

METHOD, SYSTEM AND APPARATUS FOR PROVISIONING A COMMUNICATION CLIENT

FIELD OF THE INVENTION

The present invention relates generally to communications and, in particular, to a method, system and apparatus for provisioning a communication client.

BACKGROUND OF THE INVENTION

With the advent of the Internet, society has witnessed the expansion of a global packet-switched data network into an ever-increasing number of homes and businesses. This has enabled an ever-increasing number of users to communicate with each other, primarily utilizing electronic communications, such as e-mail and instant messaging. Meanwhile, advances have been made in delivering voice communication over packet-switched data networks, driven primarily by the cost advantage of placing long-distance calls over the packet-switched data networks, but also by the ability to deliver advanced service features to users. This cost advantage can be enjoyed by both a service provider delivering the voice communication over the packet-switched data network service (in a form of lower operating cost), as well as the user who subscribes to the services of such a service provider (in a form of lower service subscription fees). Technology dealing with the delivery of real-time voice communication over the packet-switched data network is generally referred to as voice-over-packet, voice-over-IP or, simply, VoIP.

As is well appreciated in the art, the delivery technology for VoIP-based systems is fundamentally different from the delivery technology for the traditional PSTN-based systems. This is true not only for the underlining technology, but also for the user experience. For example, in the VOIP-based systems, a user has to "log into" a communication client (ex. a VoIP phone or a soft client executed on a computing apparatus) before being able to make or receive calls. Typically, the user has to input a user name and a password into the communication client. The communication client then establishes a connection with a soft switch and logs into the telephony service using the user name and the password.

Certain groups of users may find the logging in requirement confusing and difficult to implement. This is particularly true for those user segments who are accustomed to the user experience in the PSTN world, where a telephone can be simply plugged into a wall outlet at a customer premises and, provided there exists telephony service at the customer premises, the telephone will work (i.e. there will be a dial tone and the user can receive and initiate calls). The requirement to log in may prevent some of the users to choose a VoIP-based solution and, therefore, may hinder VoIP service providers from expanding their VoIP customer base to all customer segments. It would be beneficial to have a simpler way to allow a user to provision a VoIP communication client.

SUMMARY OF THE INVENTION

According to a first broad aspect of the present invention, there is provided a method for provisioning a communication client. The method comprises receiving via a communication network a request from the communication client. The method further comprises determining a positioning object associated with the communication client. The method further comprises, based on the positioning object, determining a subscription profile associated with the communication client. The method further comprises, based on the subscription profile, compiling a configuration file.

According to a second broad aspect of the present invention, there is provided an apparatus. The apparatus comprises means for receiving via a communication network a request from the communication client; means for determining a positioning object associated with the communication client; means for determining, based on the positioning object, a subscription profile associated with the communication client; and means for compiling, based on the subscription profile, a configuration file.

According to a third broad aspect of the present invention, there is provided a system. The system comprises a server operable to receive via a communication network a request from a communication client. The server is further operable to determine a positioning object associated with the communication client. The server is further operable, based on the positioning object, to determine a subscription profile associated with the communication client. The server is further operable, based on the subscription profile, to compile a configuration file.

According to another broad aspect of the present invention, there is provided a computer-readable medium comprising computer-readable program code which, when executed by a computing apparatus, causes the computing apparatus:

to receive via a communication network a request from a communication client;

to determine a positioning object associated with the communication client;

based on the positioning object, to determine a subscription profile associated with the communication client;

based on the subscription profile, to compile a configuration file.

These and other aspects and features of the present invention will now become apparent to those skilled in the art upon review of the following description of specific embodiments of the invention in conjunction with the accompanying drawings.

BRIEF DESCRIPTION OF THE DRAWINGS

Embodiments of the present invention are described with reference to the following figures, in which:

FIG. 2A is a diagram depicting a non-limiting embodiment of a subscription data repository within the infrastructure of FIG. 1A, 1B or 1C;

FIG. 3 is a flow chart depicting a non-limiting embodiment of a method for provisioning a communication client within the infrastructure of FIG. 1A;

It is to be expressly understood that the description and drawings are only for the purpose of illustration of certain embodiments of the invention and are an aid for understanding. They are not intended to be a definition of the limits of the invention.

DETAILED DESCRIPTION OF THE EMBODIMENTS

Figure 1A:
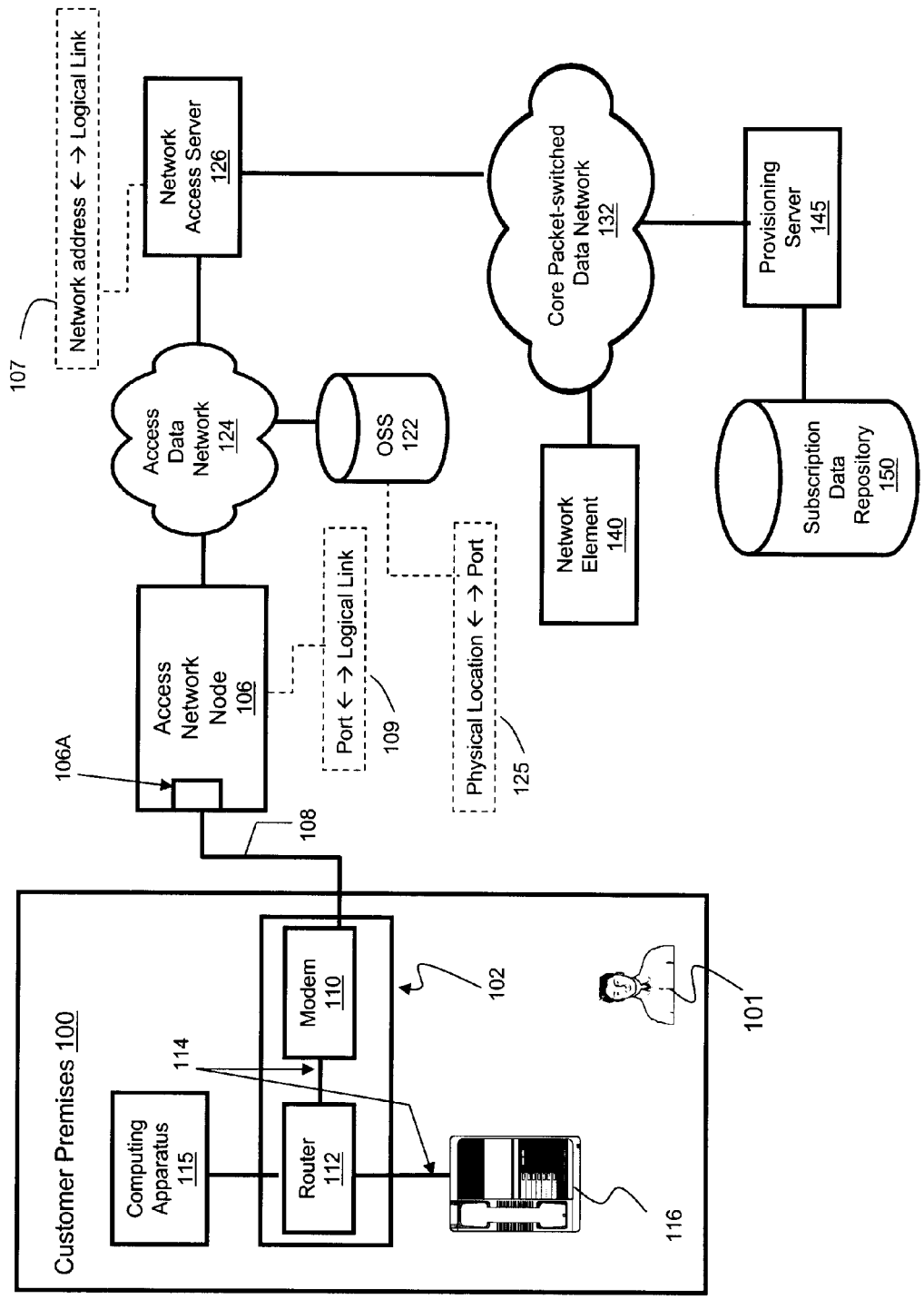
FIGS. 1A, 1B and 1C are diagrams representing various components of an infrastructure for provisioning a communication client according to various non-limiting embodiments of the present invention.

FIG. 1A shows various components of an infrastructure for provisioning a communication client in accordance with a non-limiting embodiment of the present invention. The infrastructure comprises an access device 102 which is connected to an access network node 106 via a physical connection link 108. In a non-limiting example, the access device 102 can comprise a modem 110 connected to a router 112 over a home network 114. The modem 110 can comprise any suitable broadband modem, such as, but not limited to, a cable modem, an xDSL modem, an Optical Network Terminal (ONT), a wireless access point (such, as for example, a WiFi access point, a WiMax indoor or outdoor access unit, etc.) and the like. The router 112 can be embodied in any suitable wired router, wireless router or a combined wired/wireless router. In some non-limiting embodiments, the home network 114 can comprise an Ethernet network. In other non-limiting embodiments, the home network 114 can comprise a wireless network (ex. an 802.11 based network, an 802.12 based network and the like). People skilled in the art will appreciate that the home network 114 may have other configurations.

The router 112 may in turn be connected over the home network 114 to a computing apparatus 115. The computing apparatus may comprise any suitable general purpose computer, such as, a desktop, a laptop, etc. The home network 114 may be further coupled to a communication client 116. The communication client 116 can comprise a VoIP phone, a Plain Old Telephone Service (POTS) phone equipped with an analog terminal adapter (ATA), a soft client executed on a computing apparatus, etc. The communication client 116 is just one non-limiting example of a communication client that can be installed at a customer premises 100 associated with a user 101. It should be understood that the customer premises 100 may comprise a number of additional communication clients that may include, but are not limited to, other VoIP phones, a wireless VoIP phone (such as, for example, a WAP wireless phone), a Plain Old Telephone System (POTS) phone equipped with an Analog Terminal Adapter (ATA), other computing apparatuses executing soft clients, a set-top box, a gaming device, a security system and the like. The number of communication clients installed within the customer premises 100 is not limited other than by business considerations of a service provider.

In some non-limiting embodiments of the present invention, the functionality of the router 112 and the modem 110 can be embodied in a single device, which is sometimes referred to as a "home gateway". In an alternative non-limiting embodiment of the present invention, the router 112 can be omitted from the infrastructure of FIG. 1A. In yet further non-limiting embodiments of the present invention, some or all of the functionality of the modem 110 or the router 112 can be incorporated into the communication client 116. Alternatively, in yet other non-limiting embodiments of the present invention, the functionality of the router 112, the modem 110 and the communication client 116 can be incorporated into a single device.

In an example non-limiting embodiment, the physical connection link 108 can be a copper twisted pair, over which higher-layer protocols allow for the exchange of packets. In an alternative non-limiting embodiment, the physical connection link 108 may comprise an Ethernet link, a fiber optic link (e.g., Fiber-to-the-Home, Fiber-to-the-Curb, etc.), a wireless link (e.g., EV-DO, WiMax, WiFi, CDMA, TDMA, GSM, and the like), a cable data access link, etc., or a combination thereof.

In the specific non-limiting embodiment of FIG. 1A, it shall be assumed that the infrastructure of FIG. 1A is based on an xDSL technology. Within this specific non-limiting embodiment of the present invention, the access network node 106, which in a non-limiting embodiment can be a digital subscriber line access multiplexer (DSLAM), is connected to a network access server (NAS) 126 via an access data network 124. In a non-limiting embodiment, the access network node 106 can comprise a Stinger® FS+ DSL Access Concentrator from Lucent Technologies, 600 Mountain Avenue, Murray Hill, N.J., USA. In these embodiments, the access network node 106 can be located in a central office (not depicted) of a service provider. Alternatively, the access network node 106 can be located at an outside location, in which case, the access network node 106 can be embodied in what is referred to in the industry as an OPI-DSLAM or an outside plant interface DSLAM. In this scenario, the DSLAM 120 can comprise a Stinger® Compact Remote from Lucent Technologies. Yet in other embodiments of the present invention, the access network node 106 can be distributed, with some components being situated in the central office and some components being situated at the outside location. Other alternatives will be described in greater detail herein below.

Within the specific non-limiting example under consideration here, where the access network node 106 comprises a DSLAM, the purpose of the access network node 106 is to multiplex several physical connection links (such as the physical connection link 108) from several access devices (such as, for example, the access device 102) for communication over the access data network 124 and vice versa.

The NAS 126 is sometimes also referred to by some in the industry as a broadband remote access server (BRAS), a remote access server (RAS) or a broadband access server (BAS). The NAS 126 provides access to a core packet-switched data network 132, such as the Internet, over which data (including, but not limited to, data associated with a VoIP call) can be exchanged. In alternative embodiments of the invention, the core packet-switched data network 132 can be implemented in any suitable data network adapted for supporting VoIP calls, such as, but not limited to, a private data network, a public data network and the like. The type of the access data network 124 is immaterial for the purposes of the embodiments of the present invention. Generally speaking, the access data network 124 can support one or more logical links (not depicted) between the access network node 106 and the NAS 126 (such as asynchronous transfer mode (ATM) permanent virtual circuit (PVC), a virtual local area network (VLAN) and the like).

The NAS 126 can be generally responsible for regulating access to the core packet-switched data network 132 by various access devices coupled to the access data network 124 (such as, for example, the access device 102, the computing apparatus 115 or the communication client 116). Among other functions performed by the NAS 126, the NAS 126 may be responsible for obtaining on behalf of or for assigning network addresses to the devices connected to the access data network 124 for the purposes of exchanging data via the core packet-switched data network 132. For example, the NAS 126 may be responsible for receiving a network address request from the access device 102 and for assigning a network address, such as, for example, an IP address to the access device 102. In the specific example being presented in FIG. 1A the NAS 126 can assign a public IP address to the access device 102. As one skilled in the art will appreciate, the public IP address assigned to the access device 102 is routable on the core packet-switched data network 132 or, in other words, is visible to other device(s) coupled to the core packet-switched data network 132.

In some non-limiting embodiments of the present invention, the router 112 can implement a DHCP server functionality. In other words, the router 112 can be responsible for assigning an IP address to communication clients coupled thereto (such as, for example, the communication client 116) or the computing apparatus 115. Within these embodiments of the present invention, the IP address assigned to the communication client 116 by the router 112 can be a local IP address, i.e. the IP address routable only on the home network 114. In these embodiments, the router 112 can also perform network address translation (NAT) functionality. Put another way, the IP address assigned by the router 112 to the devices connected thereto (ex. the communication client 116, the computing apparatus 115, etc.) can be a private IP address used for addressing devices connected to the home network 114 (such as, for example, the communication client 116) and the router 112 can perform a network address functionality by translating one or more private IP addresses into a public IP address used by the router 112 for communication with entities outside of the home network 114 via the core packet-switched data network 132 and vice versa.

In an alternative non-limiting embodiments of the present invention, some or all of the communication clients coupled to the access device 102 (for example, some or all of the computing apparatus 115, the communication client 116, etc.) may be assigned a public IP address. How the computing apparatus 115 or the communication client 116 are assigned a respective public IP address can be implemented in substantially the same manner as described above in the context of the access device 102 being assigned a public IP address by the NAS 126.

The process for authenticating a network address request and for assigning network addresses is known in the art and, as such, no detailed description will be presented. Suffice it to say that, in some embodiments of the present invention, the NAS 126 can authenticate the network address request received, for example, from the access device 102. How the NAS 126 authenticates the received network address is not particularly limited. For example, the NAS 126 can authenticate the received network address request based on a dedicated logical connection via which the network address request is received. In the non-limiting example where the access device 102 broadcasts a network address request via a dedicated VLAN, the NAS 126 can authenticate the network address on the basis of a VLAN identifier associated with the dedicated VLAN via which such network address request has been received. Once the network address request is authenticated, the NAS 126 may assign a network address (such as, for example, an IP address and the like) to the access device 102 which has originated the network address request. Accordingly, the NAS 126 may maintain a mapping 107, which maps, on the one hand, an indication of a given network address and, on the other hand, an indication of a logical link (ex. the VLAN identifier) to which the given network address is assigned to. The mapping 107 can be generated, for example, when the access device 102 is plugged in for the first time and can be updated every time when the access device 102 attempts to obtain a network address from the NAS 126. Alternatively, the mapping 107 can be generated when the computing apparatus 115 or the communication client 116 are assigned with a respective public IP address. It should be noted that other alternatives of how the NAS 126 authenticates the network address request and assign a network address are possible and will become apparent to those of skill in the art.

The access network node 106 can comprise a number of ports, such as a port 106A depicted in FIG. 1A. In some embodiments of the present invention, the port 106A is dedicated to the physical connection link 108. In these embodiments, each port of the access network node 106 (such as the port 106A) can be associated with a dedicated logical link, for example the aforementioned PVC or VLAN, which in turn can be uniquely associated with the physical connection link 108. The functionality of the access network node 106 is inter alia to allow data arriving from the NAS 126 along a given PVC or VLAN to be sent over corresponding physical communication links (such as, for example, the physical connection link 108) via a corresponding one of its ports (ex. the port 106A) and vice versa. To this end, the access network node 106 can implement a mapping 109 between, on the one hand, a given dedicated logical link (ex. the aforementioned VLAN identifier) and, on the other hand, a port of the access network node 106 associated with the given dedicated logical link (ex. the port 106a).

Also provided in FIG. 1A is a network element 140, which in some embodiments of the present invention can be provided at an edge of the core packet-switched data network 132. The network element 140 is referred to in the industry as a "packet switch" or a "soft switch" and comprises circuitry, software and/or control logic for providing various VoIP telephony service to communication clients (such as, for example, the communication client 116). Examples of such VoIP telephony service include (i) connecting incoming calls to the communication clients; and (ii) handling outgoing calls originated from the communication clients. Other examples of VoIP telephony service that can be performed by the network element 140 can include but are not limited to call waiting, call forking, and so on.

In addition, the network element 140 can comprise suitable circuitry, software and/or control logic for exchanging calls with entities outside of the core packet-switched data network 132. This is particularly convenient, when a call placed by the communication client 116 to a telephone number that is reachable only via a network different from the core packet-switched data network 132, such as, for example, the Public Switched Telephone Network (PSTN) or a wireless communication network, both of which have been omitted from FIG. 1A for the sake of simplicity. A non-limiting example of the network element 140 can be embodied in a MCS 5200 Soft Switch manufactured by Nortel Networks Ltd. of 8200 Dixie Road, Brampton, Ontario L6T 5P6, Canada. Those of skill in the art will appreciate that the network element 140 may have other configurations.

Communicatively coupled to the core packet-switched data network 132 is a provisioning server 145. The function of the provisioning server 145 will be discussed in greater detail herein below. For now, suffice it to say, that the provisioning server 145 is operable to register communication clients (such as the communication client 116) as they are connected to the access data network 124. More specifically, the provisioning server 145 can be operable to validate the communication client, compile configuration files, perform service activation and the like.

The provisioning server 145 can be reached via the core packet-switched data network 132 at a network address, such as, but not limited to, an IP address. In some non-limiting embodiments, the IP address assigned to the provisioning server 145 can be a static IP address. An indication of the static IP address can be hard coded into the communication client 116. In an alternative non-limiting embodiment of the present invention, the provisioning server 145 can be associated with a Uniform Resource Locator (URL), such as, for example, "http://www.provisioning.serviceprovider.com". In these non-limiting embodiments of the present invention, the communication client 116 may be pre-programmed with the URL of the provisioning server 145. In other words, the communication client 116 is aware of a location at which the provisioning server 145 can be reached over the core packet-switched data network 132. In an alternative non-limiting embodiment of the present invention, the NAS 126 may be aware of the location of the provisioning server 145. Within these non-limiting embodiments of the present invention, the communication client 116 need not be aware of the location of the provisioning server 145 and the NAS 126 can be responsible for routing any requests received from the communication client 116, for example, to the provisioning server 145 as will be described in greater detail herein below. One skilled in the art will appreciate that other alternatives of how the communication client 116 can reach the provisioning server 145 are possible.

The provisioning server 145 can implement one or more protocols for communicating with communication clients (such as, for example, the communication client 116). In some non-limiting embodiments of the present invention, the provisioning server 145 can implement an XML over HTTPS protocol. In alternative non-limiting embodiments of the present invention, a Session Initiation Protocol or, simply, a SIP protocol can be used. In yet other embodiments, which are particularly applicable where the communication client 116 comprises a computing apparatus operable to execute a soft client application, Simple Object Access Protocol (SOAP) can be used. In yet further embodiments of the present invention, an Extensible Mark-up Language (XML) Configuration Access Protocol (XCAP), available from http://www.ietf.org/internet-drafts/draft-ietf-simple-xcap-11.txt, can be used. It should be noted that in alternative non-limiting embodiments, any other suitable protocol can be used.

In some embodiments of the present invention, the network element 140 and the provisioning server 145 can implement Simple Object Access Protocol (SOAP). As such, the network element 140 and the provisioning server 145 can exchange messages using SOAP via the core packet-switched data network 132. Any other suitable communication protocol can be used for the purposes of communication between the network element 140 and the provisioning server 145.

Communicatively coupled to the provisioning server 145 can be a subscription data repository 150. In some embodiments of the present invention, the subscription data repository 150 can be directly coupled to the provisioning server 145. In an alternative non-limiting embodiment of the present invention, the provisioning server 145 can access the subscription data repository 150 via the core packet-switched data network 132 or via another network. In some of these embodiments, the provisioning server 145 and the subscription data repository 150 can implement a security protocol for exchanging data therebetween. The subscription data repository 150 will now be described in greater detail with reference to FIG. 2, which depicts a specific non-limiting embodiment of such a subscription data repository 150.

In some embodiments of the present invention, the subscription data repository 150 can be under the control of the same entity that controls the provisioning server 145 (for example, the same service provider, etc.). In an alternative non-limiting embodiment of the present invention, the subscription data repository 150 can be under the control of an entity different from the entity that controls the provisioning server 145. Within these non-limiting embodiments of the present invention, the subscription data repository 150 can be coupled to a plurality of provisioning servers, including the provisioning server 145.

The subscription data repository 150 can maintain a number of records associated with users that subscribe to VoIP telephony service delivered by a service provider who manages the subscription data repository 150. For the purposes of the specific non-limiting example discussed herein below, it is assumed that a record 202 is associated with the communication client 116. The record 202 can comprise several fields, such as a user identifier 220, a positioning object 222 and a subscription profile 224. The purpose of the user identifier 220 is to identify a particular user or a communication client associated with the particular user whom the record 202 is associated with. An example of the user identifier 220 can be embodied in a Session Initiation Protocol (SIP) Universal Resource Identifier (URI) address associated with the user 101. For the purposes of the example to be presented herein below it is assumed that all communication clients (such as the communication client 116) installed at the customer premises 100 are to be associated with the SIP URI associated with the user 101. It should be expressly understood that in an alternative non-limiting embodiments of the present invention, the user identifier 220 can comprise other types of user account identifiers, a telephone number, an IP address, a proprietary identifier, etc.

In some embodiments of the present invention, the positioning object 222 can comprise an indication of a location object associated with the communication client 116. In a first non-limiting embodiment of the present invention, the location object maintained within the positioning object 222 can comprise an indication of the physical location of the communication client 116 (ex. an indication of a street address, a set of geo-coordinates, a location code, etc.) associated with the customer premises 100 where the user 101 subscribes to the VoIP telephony service. In an alternative non-limiting embodiment of the present invention, the positioning object 222 may comprise any suitable location object that is indicative of the location of the customer premises 100. Examples of the location objects include, but are not limited to, port identifier associated with the physical connection link 108 serving the customer premises 100, a location code, etc.

In alternative non-limiting embodiments of the present invention, the positioning object 222 can comprise an indication of a device identifying object, such as, for example, a unique identifier of the communication client 116. Some examples of the device identifying objects that can be stored within the positioning object 222 include, but are not limited to, a MAC address, an electronic serial number (ESN), a proprietary identifier, etc.

The indication of the service positioning object 222 is provided during a service subscription process to be described herein below. The subscription profile 224 can comprise one or more of the following: an indication of which telephony features the user 101 subscribes to as part of the VoIP telephony service at the customer premises 100, an indication of a billing plan, credit card information that is to be used for billing purposes, etc. In some embodiments of the present invention, the subscription profile 224 may further comprise an indication of a location of the network element 140 that is responsible for delivering VoIP telephony service to the communication client 116.

In some embodiments of the present invention, data maintained within the user identifier 220 can be used as a log in name for logging the communication client 116 into the VoIP telephony service provided by the network element 140. In an alternative embodiment of the present invention, the subscription profile 224 may maintain a separate user identifier that can be used for the purposes of the logging in. In some of these non-limiting embodiments, the subscription profile 224 (or another field within the subscription data repository 150) may comprise an indication of a password to be used for the purposes of the logging in process.

The positioning object 222 and the subscription profile 224 of a given record associated with a given user can be populated when the given user subscribes to the VoIP telephony service. How the user subscribes to the VoIP telephony service is not particularly limited and, some non-limiting examples include, but are not limited to, interacting over a telephone connection with a customer services representative associated with a service provider who is to deliver the VoIP telephony service, interacting with an interactive voice response system associated with a service provider who is to deliver the VoIP telephony service, visiting a store associated with a service provider who is to deliver the VoIP telephony service or an independent communication services retail store that carries equipment and subscription packages from more than one service provider, accessing a web site or a web portal associated with a service provider who is to deliver the VoIP telephony service, etc.

Naturally, the subscription data repository 150 can maintain a number of other records, collectively depicted at 204. These records 204 can be associated with other subscribers to the VoIP telephony services provided by the aforementioned service provider.

In an alternative non-limiting embodiment of the present invention, the subscription data repository 150 can maintain a number of records associated with users that subscribe to access service delivered by a service provider who manages the subscription data repository 150. For example, the subscription data repository 150 can maintain a user identifier 220, a positioning object 222 and a subscription profile 224 associated with a subscription to the access service for the user 101 at the customer premises 100. In an example non-limiting embodiment, the access service can be a service that allows the user 101 using, for example, the computing apparatus 115 to access the core packet-switched data network 132. For example, the user 101 may employ the computing apparatus 115 to access a particular resource coupled to the core packet-switched data network 132, to transmit an electronic message to a recipient coupled to the core packet-switched data network 132, engage in an instant messaging session with a destination coupled to the core packet-switched network 132, etc.

The infrastructure of FIG. 1A further comprises an operation support system (OSS) 122. The OSS 122 generally represents a collection of systems that performs management, inventory, engineering, planning and repair functions for the service provider. To this end, one of the functions performed by the OSS 122 is management of network elements, assets and equipment. Thus, the OSS 122 can maintain a mapping 125 between, on the one hand, the ports of various access multiplexers under control of the service provider and, on the other hand, location objects representative of the respective physical locations of the access devices connected to those ports. In an alternative non-limiting embodiment of the present invention, the mapping 125 may maintain a relationship between, on the one hand, the ports of various access multiplexers under control of the service provider and, on the other hand, location objects that can be used for determining the respective physical locations of the access devices connected to those ports (such as, for example, a location code, an arbitrary code, etc.). In yet further non-limiting embodiments of the present invention, the indication of the port identifier can be in itself a location object indicative of the identity and/or location of the access device 102.

In the specific case under consideration here, the mapping 125 maintained by the OSS 122 relates port 106A of the access network node 106 to a location object indicative of the physical location of the access device 102 (ex. the street address of the customer premises 100). The mapping 125 can be generated by the OSS 122 when access service at the customer premises 100 is provisioned, for example, in the form of subscribing to an ISP service at the customer premises 100. It should be noted that in an alternative non-limiting embodiment of the present invention, the OSS 122 may further maintain a copy of the aforementioned mapping 109. In some embodiments of the present invention, the OSS 122 may maintain a copy of the mapping 107.

In some embodiments of the present invention, the OSS 122 is communicatively coupled to the access data network 124 and, as such, can be accessible to the provisioning server 145 via the core packet-switched data network 132 and the access data network 124. In an alternative non-limiting embodiment of the present invention, the OSS 122 can be coupled to the core packet-switched data network 132. In an alternative non-limiting embodiment, the provisioning server 145 and the OSS 122 may have a dedicated point-to-point connection. Yet in alternative non-limiting embodiments of the present invention, the functionality of the OSS 122 and the provisioning server 145 can be integrated into a single apparatus. In further non-limiting embodiment of the present invention, the provisioning server 145 and the OSS 122 may implement a security protocol for exchanging secure data therebetween.

Of course, as will be apparent to those skilled in the art that numerous modifications and variations of the infrastructure of FIG. 1A are possible. For example, in an alternative non-limiting embodiment, the access network node 106 can be omitted. This is especially true in the case where the access device 102 implements a wireless access point (such, as for example, a WiFi access point, a WiMax indoor or outdoor access unit, etc.). In an example non-limiting embodiment of this scenario, the connection between the wireless access point and the NAS 126 can be provided by a dedicated point-to-point wireless link. Within these non-limiting embodiments of the present invention, the NAS 126 can maintain a mapping substantially similar to the mapping 109, which can correlate an identifier of a given wireless access point and a location object associated therewith. In another non-limiting scenario where the modem 110 implements a cable modem, the access network node 106 can also be omitted. Yet in another non-limiting embodiment, the NAS 126 can be omitted from the infrastructure of FIG. 1A.

Figure 1B:
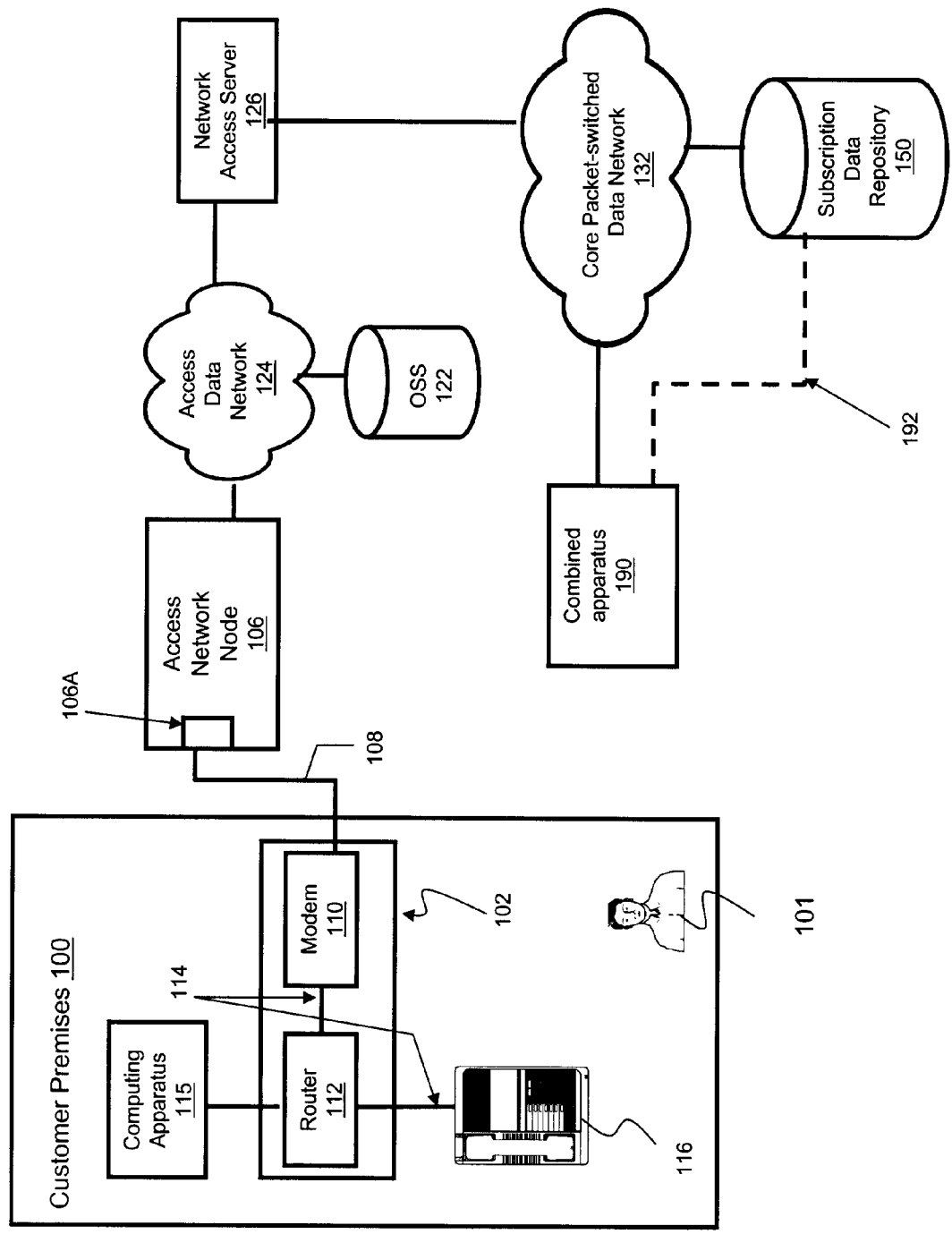

It should be noted that in some non-limiting embodiments of the present invention, the functionality of the provisioning server 145 and the network element 140 can be integrated into a single device, as depicted in FIG. 1B. In a non-limiting embodiment depicted in FIG. 1B, the functionality of the provisioning server 145 and the network element 140 is embodied in a combined apparatus 190. The combined apparatus 190 can access the subscription data repository 150 via the core packet-switched data network 132. In an alternative non-limiting embodiment of the invention, the subscription data repository 150 can be connected directly to the combined apparatus 190 via a direct link (depicted as 192). In another non-limiting embodiment of the present invention, the subscription data repository 150 can be integrated into the functionality of the combined apparatus 190.

Given the components of the infrastructure of FIG. 1A described above, it is possible to deliver VoIP telephony service to the user 101 of the communication client 116. The VoIP telephony service can be delivered by a service provider who provides the access service to the customer premises 100. Alternatively, the VoIP telephony service can be delivered by an alternative service provider in which case the VoIP telephony service "runs over" the infrastructure of FIG. 1A, for example. This arrangement for delivering the VoIP telephony service is generally referred to as "over-the-top VoIP". As is known to those of skill in the art, before the communication client 116 can originate outgoing calls or receive incoming calls, the communication client 116 needs to "log into" the service with the network element 140 or, in other words, the communication client 116 needs to be provisioned with the network element 140.

Figure 4:
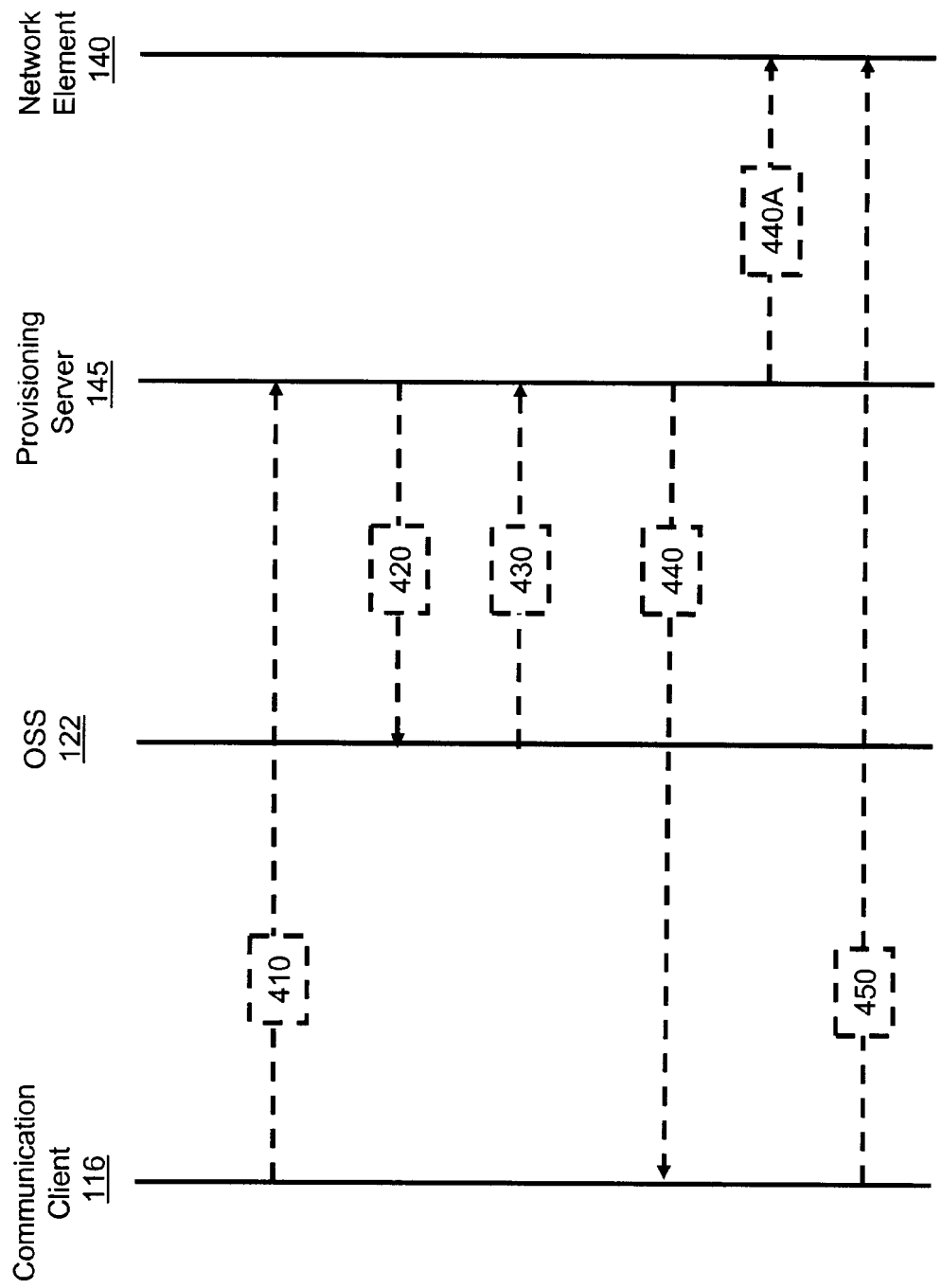
FIG. 4 is a flow signal diagram depicting a non-limiting embodiment of a flow of signals exchanged between components of the infrastructure of FIG. 1A during execution of the method of FIG. 3.

Given the infrastructure of FIG. 1A, it is possible to perform a method for provisioning a communication client. With reference to FIG. 3 a method for provisioning a communication client according to a non-limiting embodiment will now be described. The method of FIG. 3 will be illustrated with a signal flow of FIG. 4, which illustrates a non-limiting embodiment of a flow of signals exchanged between various components of FIG. 1A in the context of executing the method of FIG. 3. The method for provisioning a communication client will be illustrated using the following non-limiting scenario:

The user 101 has already subscribed to an access service at the customer premises 100 and it has been fully provisioned (i.e. the aforementioned mappings 107, 109, 125 have been generated). The user 101 wishes to subscribe to the VoIP telephony service at the customer premises 100, the VoIP telephony service to be delivered by the service provider who delivers the access service. The user 101 has visited a store associated with the service provider where the user 101 has subscribed to the VoIP telephony service to be delivered at the customer premises 100 and has purchased or rented the communication client 116, which in this example is embodied in a VoIP phone. A clerk in the store has interacted with the provisioning server 145 (for example, via a secure web portal) to populate the aforementioned record 202 in the subscription data repository 150). The user identifier 220 of the record 202 has been provisioned with a SIP URI associated with the user 101, the positioning object 222 of the record 202 has been provisioned with an address of the customer premises 100 (such as, for example, a street address, etc.) and the subscription profile 224 of the record 202 has been provisioned with a password associated with the user 101, as well as with an indication of telephony features that the user 101 has subscribed to (ex. call waiting, etc.). It shall be assumed that data maintained within the user identifier 220 can be used as a user identifier for the purposes of the logging in process. It should be expressly understood that the above-described scenario is used for illustration purposes only and that numerous alternatives are possible.

Step 310: Provisioning Server 145 Receives a Request

The method begins at step 310 at which the provisioning server 145 receives a request.

In a non-limiting embodiment of the present invention, step 310 can be executed when the user 101 plugs the communication client 116 in. In an alternative non-limiting embodiment of the present invention, step 310 can be executed when the user 101 powers the communication client 116. In yet further non-limiting embodiments of the present invention, step 310 can be executed at a pre-determined event, such as, for example, when the user 101 executes the aforementioned soft client on the communication client 116.

When the communication client 116 is plugged in for the first time (or is powered on for the first time, or upon occurrence of the pre-determined event), the communication client 116 can broadcast an IP address request. For example, the communication client 116 can generate and broadcast an Ethernet frame containing the IP address request via the home network 114. Other ways to transmit the IP address request are, of course, possible. Recalling that in some non-limiting embodiments of the present invention, the router 112 can perform the DHCP server functionality, responsive to the receipt of the IP address request, the router 112 can assign a local IP address in a manner known to those of skill in the art.

The communication client 116 then generates a request 410. In some embodiments of the present invention, the request 410 is generated in accordance with XML over HTTPS protocol, however, as one skilled in the art will appreciate, other communication protocols can be used.

Recalling that the communication client 116 can be aware of the location of the provisioning server 145, the communication client 116 transmits the request 410 to the provisioning server 145. As one skilled in the art will appreciate, in those embodiments of the present invention, where the communication client 116 is associated with a private IP address, the access device 102 can perform network address translation process known to those of skill in the art. Within these embodiments of the present invention, the request 410 comprises an indication of the network address associated with the access device 102 that has transmitted the request 410 on behalf of the communication client 116.

In an alternative non-limiting embodiment of the present invention, the communication client 116 can transmit the request 410 to the NAS 126. Recalling that in some embodiments of the present invention the NAS 126 can be aware of the location of the provisioning server 145, the NAS 126 can then transmit a copy of the request 410 or another message derived on the basis of the request 410 to the provisioning server 145.

In those embodiments of the present invention, where the NAS 126 is responsible for assigning a public IP address to the communication client 116, the request for a public IP address and the request 410 can be embodied in a single message. In other words, the NAS 126 can transmit a request substantially similar to the request 410 to the provisioning server 145 responsive to receiving a public IP address request from the communication client 116.

The provisioning server 145 receives the request 410 and examines the content thereof. By examining the request 410, the provisioning server 145 becomes aware of the network address of the access device 102 that has transmitted the request 410 on behalf of the communication client 116. In an alternative non-limiting embodiment of the present invention, which is particularly applicable where the communication client 116 is assigned a public IP address, the provisioning server 145 can examine the received request 410 to determine the public IP address of the communication client 116.

Step 320: Provisioning Server 145 Determines a Positioning Object Associated with the Communication Client 116

At step 320, the provisioning server 145 determines a positioning object associated with the communication client 116 that has originated the request 410. In a first non-limiting embodiment of the present invention, the provisioning server 145 transmits a query 420 to the OSS 122 to trigger the OSS 122 to determine the positioning object associated with the communication client 116 that has originated the request 410.

It will be recalled that in some embodiments of the present invention, the OSS 122 maintains the mapping 125 and maintains copies of the mappings 107, 109. In alternative embodiments of the present invention, the OSS 122 can request the mapping 107 and the mapping 109 from the NAS 126 and the access network node 106 respectively.

In some embodiments of the present invention, where the positioning object comprises a location object, the OSS 122 can determine the location object by using the following non-limiting approach. Based on the network address of the access device 102 that is responsible for transmitting the request 410 on behalf of the communication client 116, the OSS 122 first correlates the mapping 107 (network address—logical link correlation) and the mapping 109 (port—logical link correlation) to determine the port of the access network node 106 associated with the access device 102. Based on the port, the OSS 122 then locates the record 124 (physical location—port) that is associated with the port associated with the access device 102 (i.e. the port 106a) and determines the location object associated with the access device 102 and, therefore, the communication client 116.

In some embodiments of the present invention, the OSS 122 can then generate a response 430, the response 430 containing the indication of the location object associated with the communication client 116. The OSS 122 then transmits the response 430 to the provisioning server 145.

In a second non-limiting embodiment of the present invention, the provisioning server 145 can perform the determination of the location object associated with the communication client 116 using the following non-limiting approach. In some non-limiting embodiments of the present invention, the provisioning server 145 can request a copy of the mapping 109 from the access network node 106, then request a copy of the mapping 107 from the NAS 126 and a copy of the mapping 125 from the OSS 122. The network element 112 can then perform the correlation between copies of the mappings 107, 109, 125 in substantially the same manner as has been described immediately above. In an alternative non-limiting embodiment, where the OSS 122 maintains a copy of the mapping 107 and the mapping 109, the provisioning server 145 can request the mapping 107, 109, 125 from the OSS 122.

In an alternative non-limiting embodiment of the present invention, the mapping 125 can be omitted. For example, within some non-limiting embodiments of the present invention, the location object associated with the communication client 116 can be embodied in the associated port identifier of the access network node 106 (i.e. the port 106A). Within these non-limiting embodiments of the present invention, the location object can be determined by correlating the mapping 107 and the mapping 109 (or copies thereof). This correlation can be performed by the OSS 122 or by the provisioning server 145 in substantially the same manner as has been described above.

In yet further non-limiting embodiments of the present invention, which are particularly applicable where the positioning objects comprises a device identifying object (ex. a MAC address, an ESN or a public IP address of the communication client 116), the provisioning server 145 can determine the device identifying object by analyzing the request received as part of step 310. Within some of these non-limiting embodiments, the provisioning server 145 can examine the received request to determine one or more of a MAC address, a public IP address, an ESN or the like associated with the communication client 116.

Step 330: Based on the Positioning Object, the Provisioning Server 145 Compiles a Configuration File Then, at step 330, the provisioning server 145 compiles a configuration file 440, based on the location determined at step 320. More specifically, the provisioning server 145 accesses the subscription data repository 150 and performs a look up to determine whether there exists a record comprising a positioning object 222 that matches the positioning object determined at step 320.

Should the provisioning server 145 fail to locate a record comprising a positioning object 222 that matches the positioning object determined at step 320, the provisioning server 145 can deduce that the user 101 at the customer premises 100 (where the communication client 116 that has originated the request 410 is located) is not a subscriber to the VoIP telephony service. The provisioning server 145 may then invite the user 101 to subscribe to the VoIP telephony service, for example, by sending an electronic message to the computing apparatus 115 or the communication client 116, by establishing a voice call with the user 101, by sending an SMS, by sending an e-mail, by sending a letter in the mail, etc. In an alternative non-limiting embodiment of the present invention, the provisioning server 145 could transmit a query to another provisioning server associated with another service provider (not depicted) to determine whether the other provisioning server comprises an indication of the location object associated with the communication client 116.

In the specific example being presented herein, the provisioning server 145 determines that record 202 comprises the positioning object 222 that matches the positioning object determined at step 320. The provisioning server 145 then compiles the configuration file 440. In some embodiments of the present invention, the purpose of the configuration file 440 is to maintain data that would allow the communication client 116 to be logged into VoIP telephony service provided by the network element 140. To that end, the configuration file 440 may comprise data maintained within the user identifier 220 (or an indication of another user identifier maintained within, for example, the subscription profile 224).

The configuration file 440 may further comprise an indication of the password. Optionally, within some embodiments of the present invention, the configuration file 440 may further comprise an indication of telephony features maintained within the subscription profile 224. In some embodiments of the present invention, the configuration file may further include an indication of a location of the network element 140.

Step 340: the Provisioning Server 145 Releases the Configuration File 440

Next, at step 340, the provisioning server 145 releases the configuration file 440. In a first non-limiting embodiment of the present invention, the provisioning server 145 releases the configuration file 440 to the communication client 116. Within these embodiments of the present invention, the communication client 116, upon receipt of the configuration file 440, can generate a registration message 450 destined to the network element 140, the registration message 450 based at least in part on the data received as part of the configuration file 440. To that end, the registration message 450 can comprise the user identifier and the password to enable the communication client 116 to log into the VoIP telephony service provided by the network element 140. In those embodiments of the present invention, where the configuration file 440 comprises an indication of the telephony features, the communication client 116 can use the indication of the telephony feature contained in the configuration file 440 to activate them with the network element 140.

It will be recalled that in some embodiments of the present invention, the configuration file 440 may comprise an indication of the location of the network element 140. The communication client 116 can be operable to retrieve that indication of the location of the network element 140 from the configuration file 440 and to transmit the registration message 450 towards the network element 140 using the indication of the location thereof. In an alternative non-limiting embodiment of the present invention, the indication of the location of the network element 140 can be pre-programmed into the communication client 116 (or the access device 102).

According to a second non-limiting embodiment of the present invention, the provisioning server 145 releases the configuration file 440 towards the network element 140 to allow for a remote log in of the communication client 116 into the VoIP telephony service provided by the network element 140. This action is depicted as a signal flow 440A in FIG. 5. Within these non-limiting embodiments of the present invention, the provisioning server 145 may optionally release another configuration file, substantially similar to the configuration file 440, towards the communication 116. This configuration file can be used for re-logging in at a later time, to convey service settings, etc.

Recalling that in some embodiments of the present invention the subscription data repository 150 can maintain data associated with access service associated with the customer premises 100, the following modifications to step 320 are envisioned. In some embodiments, as part of step 320, the provisioning server 145 may determine that there does exist a record associated with the customer premises 100 maintained within the subscription data repository 150, but that the record maintained therein is associated with the access service and there does not exist a record associated with VoIP telephony service subscribed to by the user 101 at the customer premises 100. Within these embodiments of the present invention, the provisioning server 145 may then invite the user 101 to subscribe to the VoIP telephony service, for example, by sending an electronic message to the computing apparatus 115 or the communication client 116, by establishing a voice call with the user 101, by sending an SMS, by sending a letter in the mail, etc. In an alternative non-limiting embodiment of the present invention, the provisioning server 145 could transmit a query to another provisioning server associated with another service provider (not depicted) to determine whether the other provisioning server comprises a record associated with VoIP telephony service subscribed by the user 101 at the customer premises 100.

Figure 1C:
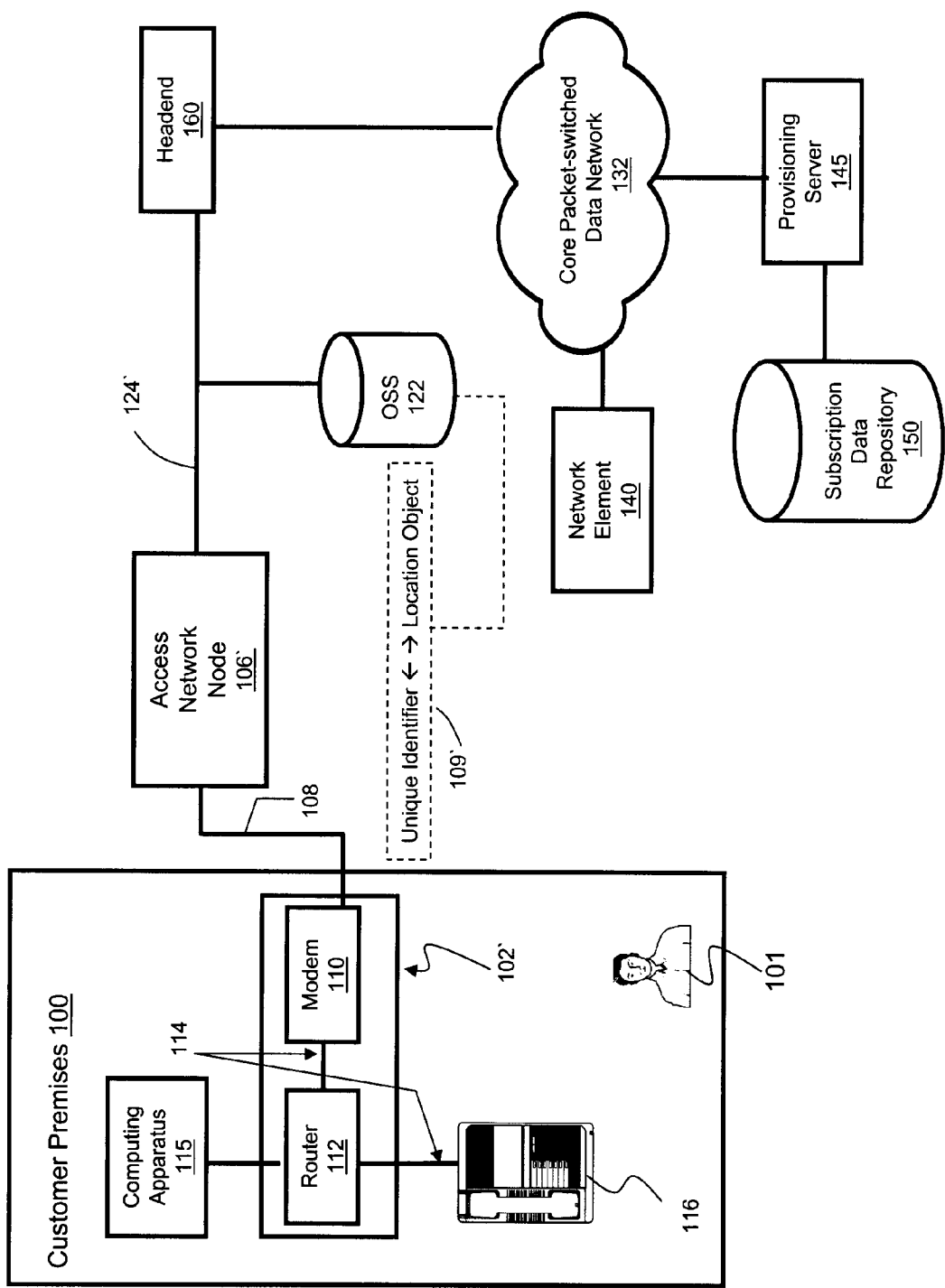

With reference to FIG. 1C another non-limiting embodiment of the infrastructure for provisioning a communication client will now be described. The infrastructure of FIG. 1C is substantially similar to the infrastructure of FIG. 1A and, as such, like elements are depicted with like numerals. The non-limiting embodiment of the infrastructure of FIG. 1C is based on a coaxial cable access technology. As such, an access network node 106' is provided. The access network node 106' may comprise a headend router, an unmanned distribution hub router, a cable modem data termination system, or a combination thereof.

Within these non-limiting embodiments of the present invention, the access network node 106' can be operable to serve a plurality of access devices (only one of which, an access device 102', is depicted) by providing access to a cable headend 160 via an access network 124'. Within these non-limiting embodiments of the present invention, the access network 124' can be arranged in a "tree and branch" topography. Within the tree and branch topography, each of the access devices served by the access network node 106, as well as communication clients coupled to the access devices (such as, for example, the computing apparatus 115, the communication client 116, etc.) can be associated with a unique identifier, such as, but not limited to, a MAC address, an ESN, a static IP address, a proprietary identifier, etc.

Within these non-limiting embodiments of the present invention, the OSS 122 can maintain a mapping 109', which can correlate a specific unique identifier associated with a specific access device to a location object (such as, for example, a service address) where the specific access device is located. The mapping 109' can be provisioned, for example, when access service is provisioned at the customer premises 100. In an alternative non-limiting embodiment of the present invention, the mapping 109' can be maintained at another entity, such as the access network node 106', the cable headend 160, the subscription data repository 150, etc.

Within the infrastructure of FIG. 1C, as part of executing step 310, the provisioning server 145 becomes aware of the unique identifier (such as, for example, a MAC address, an ESN, a public IP address, a proprietary identifier, etc.) associated with the communication client 116. The provisioning server 145 can then query the OSS 122, based on the unique identifier, to examine the mapping 109' in order to determine the location object associated with the communication client 116. In those embodiments of the present invention, where the mapping 109' is maintained by another entity, the provisioning server 145 can query the suitable entity to determine the location object.

In an alternative non-limiting embodiment of the present invention, which is particularly applicable where the positioning object 222 of the subscription data repository 150 stores an indication of a unique identifier associated with the communication client 116 (such as, for example, a MAC address, an ESN, a public IP address, a proprietary identifier, etc.), the provisioning server 145 can query the subscription data repository 150, based on the unique identifier of the communication client 116 in order to determine a subscription profile. Within these non-limiting embodiments of the present invention, the mapping 109' can be omitted and the unique identifier of the communication client 116 can be thought of as a device identifying object.

It should be noted that a multitude of other alternatives for how the provisioning server 145 can determine the location object at step 320 are envisioned and within the scope of embodiments of the present invention. As a non-limiting illustration, the access device 102 (or the communication client 116) can be equipped with a location object determination functional entity (not depicted). Some examples of the location object determination functional entity include, but are not limited to, a Global Positioning System (GPS) based entity, an RFID based entity, etc. Within these embodiments of the present invention, the provisioning server 145 can interrogate the location object determination functional entity to determine a location object associated with the access device 102 (or the communication client 116).

Within another non-limiting embodiment of the present invention, the provisioning server 145 can determine a location object associated with the communication client 116 based on an auxiliary identifier associated with the communication client 116. In some embodiments of the present invention, the communication client 116 can comprise a multi-networked communication client in the sense that it can be coupled to the core packet-switched data network 132, as well as another network, such as, for example, the Public Switched Telephone Network (PSTN) or a wireless communication network. The communication client 116 can be associated with an auxiliary identifier (such as, for example a telephone number) that uniquely identifies the communication client 116 to the other network. The telephone number associated with the communication client 116 can also be inherently associated with the location of the communication client, either by virtue of a terminating location within the PSTN scenario or by virtue of a billing address within the wireless network scenario.

Within these non-limiting embodiments of the present invention, the provisioning server 145 can become aware of the location object associated with the communication client 116 in the following manner. The user 101 can establish a first communication session with the provisioning server 145, for example, by establishing a telephony link with the provisioning server 145 via the PSTN. The provisioning server 145 becomes aware of the telephone number of the communication client 116, for example, by examining Caller Line Identification or another information transmitted as part of the signalling information used for establishing the telephony link between the communication client 116 and the provisioning server 145. Based on the telephone number of the communication client 116, the provisioning server 145 can then determine the location object associated with the communication client 116.

In an alternative embodiment of the present invention, the auxiliary identifier associated with the communication client 116 can be used as the location object associated with the communication client 116. Within these non-limiting embodiments of the present invention, the positioning object 222 stored within the subscription data repository 150 can comprise an indication of the auxiliary identifier associated with the communication client 116. The provisioning server 145 can determine a subscription profile associated with the communication client 116 by transmitting a query to the subscription data repository 150, the query including the indication of the auxiliary identifier. Within some of these embodiments of the present invention, the mapping 109' can be omitted.

Naturally, other alternatives for the provisioning server 145 to become aware of the location object associated with the communication client 116 are possible and within the scope of the embodiments of the present invention.

Those skilled in the art will appreciate that certain functionality of the NAS 126, the OSS 122, the provisioning server 145, subscription data repository 150 and/or other elements of the infrastructure described herein may be implemented as pre-programmed hardware or firmware elements (e.g., application specific integrated circuits (ASICs), electrically erasable programmable read-only memories (EEPROMs), etc.), or other related components. In other embodiments, certain portions of the NAS 126, the OSS 122, the provisioning server 145, subscription data repository 150 and/or other elements may be implemented as an arithmetic and logic unit (ALU) having access to a code memory (not shown) which stores program instructions for the operation of the ALU. The program instructions could be stored on a medium which is fixed, tangible and readable directly by the NAS 126, the OSS 122, the provisioning server 145, subscription data repository 150 and/or other elements, (e.g., removable diskette, CD-ROM, ROM, fixed disk, USB drive), or the program instructions could be stored remotely but transmittable to the NAS 126, the OSS 122, the provisioning server 145, the subscription data repository 150 and/or other elements via a modem or other interface device.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. A method for provisioning a communication client comprising:
   receiving via a communication network a request from the communication client, said request comprising an indication of a public network address associated with said communication client;
   determining a location object associated with said communication client, wherein said determining a location object comprises:
      based on said indication of a public network address, determining a logical link identifier associated with a logical link established between a network node responsible for facilitating access by said communication client to said communication network and said communication network;
      based on said logical link identifier, determining a port identifier of a port of a network node associated with said communication client; and
      based on said port identifier, determining said location object;
   based on said location object, determining a subscription profile associated with said communication client;
   based on said subscription profile, compiling a configuration file for said communication client;
   releasing said configuration file, wherein said configuration file comprises data for enabling said communication client to log into a communication service provided by a network element.

2. The method defined in claim 1, wherein said configuration file is released to said communication client.

3. The method defined in claim 2, wherein said data comprises a login identifier.

4. The method defined in claim 3, wherein said data further comprises an indication of a password to be used in association with said login identifier.

5. The method defined in claim 3, wherein said configuration file further comprises an indication of at least one telephony feature subscribed to by a user of the communication client.

6. The method defined in claim 1, wherein said releasing comprises releasing said configuration file to a network element responsible for handling communication sessions on behalf of said communication client.

7. The method defined in claim 1, wherein said request comprises receiving a network address request from said communication client.

8. The method defined in claim 1, wherein said receiving is executed in response to at least one of:
   said communication client being plugged in;
   said communication client being powered on;

said communication client executing a pre-determined event; and said communication client transmitting a network address request.

9. The method defined in claim 1, wherein said request is received from a network node responsible for regulating access between said communication client and said communication network.

10. The method defined in claim 1, wherein said location object comprises an indication of a geographical location.

11. The method defined in claim 1, said communication client comprising a location determination functional entity; wherein said determining a location object comprises querying said location determination functional entity to determine said location object.

12. The method defined in claim 11, wherein said location determination functional entity comprises at least one of:
    a global positioning system;
    an RFID based entity.

13. The method defined in claim 1, wherein said determining a location object comprises ascertaining an auxiliary identifier associated with said communication client.

14. The method defined in claim 13, said communication client being a multi-network communication client, wherein said communication network is one of at least two communication networks to which said communication client is operable to connect, wherein said receiving via a communication network a request comprises terminating a telephony session from said communication client via said communication network; and wherein said auxiliary identifier comprises a telephone number associated with said communication client.

15. The method defined in claim 14, wherein said configuration file is for enabling said communication client to connect to another one of said at least two communication networks.

16. A system comprising:
    a server with pre-programmed hardware elements performing the following steps:
        receiving via a communication network a request from a communication client, said request comprising an indication of a public network address associated with said communication client;
        determining a location object associated with said communication client, wherein said determining a location object comprises:
            based on said indication of a public network address, determining a logical link identifier associated with a logical link established between a network node responsible for facilitating access by said communication client to said communication network and said communication network;
            based on said logical link identifier, determining a port identifier of a port of a network node associated with said communication client; and
            based on said port identifier, determining said location object;
        based on said location object, determining a subscription profile associated with said communication client;
        based on said subscription profile, compiling a configuration file for said communication client;
        releasing said configuration file to said communication client, wherein said configuration file comprises data for enabling said communication client to log into a communication service provided by a network element.

17. The system defined in claim 16, further comprising said communication network.

18. The system defined in claim 16, wherein said configuration file is released to said communication client.

19. The system defined in claim 18, further comprising said communication client, wherein said data comprises a login identifier.

20. The system defined in claim 19, wherein said data further comprises an indication of a password to be used in association with said login identifier.

21. The system defined in claim 19, wherein said configuration file further comprises an indication of at least one telephony feature subscribed to by a user of the communication client.

22. The system defined in claim 16, wherein to release said configuration file, said server is operable to release said configuration file to a network element responsible for handling communication sessions on behalf of said communication client.

23. The system defined in claim 22, further comprising said network element, wherein said network element is operable, responsive to receipt of said configuration file, to log in said communication client into communication services provided by said network element.

24. The system defined in claim 23, wherein said configuration file further comprises an indication of at least one telephony feature subscribed to by a user of the communication client and wherein said network element is further operable to provision said at least one telephony feature in association with said communication client.

25. The system defined in claim 16, wherein the request is a network address.

26. The system defined in claim 16, further comprising said communication client, and wherein said communication client is operable to generate said request in response to one of:
    said communication client being plugged in;
    said communication client being powered on; and
    an occurrence of a pre-determined event.

27. The system defined in claim 16, wherein said request is received from a network node responsible for regulating access between said communication client and said communication network.

28. The system defined in claim 27, further comprising said network node, wherein said network node is aware of a network location of said server, and wherein said network node is operable to:
    receive said request from said communication client;
    relay said request to said server at said network location.

29. The system defined in claim 16, wherein said location object comprises an indication of a geographical location.

30. The system defined in claim 16, further comprising said communication client, wherein said communication client comprises a location determination functional entity; wherein to determine a location object, the server is operable to query said location determination functional entity to determine said location object.

31. The system defined in claim 30, wherein said location determination functional entity is operable to transmit an indication of said location object to said server.

32. The system defined in claim 30, wherein said location determination functional entity comprises at least one of:
    a global positioning system; and
    an RFID based entity.

33. The system defined in claim 16, wherein to determine a location object, the server is operable to ascertain an auxiliary identifier associated with said communication client.

34. The system defined in claim 33, further comprising said communication client, wherein said communication client comprises a multi-network communication client, wherein said communication network is one of at least two communication networks to which said communication client is operable to connect, wherein to receive via a communication network a request, the server is operable to terminate a telephony session from said communication client via said communication network; and wherein said auxiliary identifier comprises a telephone number associated with said communication client.

35. The system defined in claim 34, wherein said configuration file is for enabling said communication client to connect to another one of said at least two communication networks.

36. A non-transitory computer-readable medium comprising computer-readable program code which, when executed by a computing apparatus, causes the computing apparatus:

to receive via a communication network a request from a communication client, said request comprising an indication of a public network address associated with said communication client;

to determine a location object associated with said communication client, wherein to determine the location object comprises:

based on said indication of a public network address, determining a logical link identifier associated with a logical link established between a network node responsible for facilitating access by said communication client to said communication network and said communication network;

based on said logical link identifier, determining a port identifier of a port of a network node associated with said communication client; and based on said port identifier, determining said location object;

based on said location object, to determine a subscription profile associated with said communication client;

based on said subscription profile, to compile a configuration file for said communication client; and releasing said configuration file, wherein said configuration file comprises data for enabling said communication client to log into a communication service provided by a network element.

\* \* \* \* \*